(12) United States Patent
Kamper

(10) Patent No.: US 6,654,797 B1
(45) Date of Patent: Nov. 25, 2003

(54) APPARATUS AND A METHODS FOR SERVER CONFIGURATION USING A REMOVABLE STORAGE DEVICE

(75) Inventor: Robert J. Kamper, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,745

(22) Filed: May 25, 2000

(51) Int. Cl.⁷ ............................................. G06F 15/177
(52) U.S. Cl. ...................... 709/220; 709/203; 709/221; 709/222; 713/1; 713/2; 713/100; 717/100
(58) Field of Search ................................ 709/203, 220, 709/222; 710/8, 10; 713/100, 1, 2; 717/168, 127, 100, 103; 235/380–386; 714/4

(56) References Cited

U.S. PATENT DOCUMENTS

| | | | |
|---|---|---|---|
| 5,469,573 A | * 11/1995 | McGill et al. | 717/127 |
| 5,996,086 A | * 11/1999 | Delaney et al. | 714/4 |
| 6,101,601 A | * 8/2000 | Matthews et al. | 713/2 |
| 6,353,885 B1 | * 3/2002 | Herzi et al. | 713/1 |

* cited by examiner

Primary Examiner—Robert B. Harrell
Assistant Examiner—Hieu C. Le
(74) Attorney, Agent, or Firm—Duke W. Yee; Marilyn Smith Dawkins; Stephen J. Walder, Jr.

(57) ABSTRACT

Apparatus and methods for server configuration using a removable storage device are provided. The apparatus and methods include coupling a removable storage device reader to a server and inserting a removable storage device into the reader. The removable storage device includes configuration data that is used to configure the server. When power is supplied to the server, the server performs a boot-up sequence that includes uploading the configuration data from the removable storage device. The same removable storage device reader may be used to configure a plurality of servers. That is, the removable storage device reader is capable of being easily moved and coupled to a plurality of servers one after the other. The user may make use of the same removable storage device or different removable storage devices for each of the plurality of servers. The user is not required to have any technical knowledge regarding configuring server devices since the server performs the configuration itself upon boot-up based on the configuration information uploaded from the removable storage device.

23 Claims, 2 Drawing Sheets

APPARATUS AND A METHODS FOR SERVER CONFIGURATION USING A REMOVABLE STORAGE DEVICE

BACKGROUND OF THE INVENTION

1. Technical Field

The present invention relates to apparatus and methods for configuring servers using a removable storage device.

2. Description of the Related Art

A new trend in network and Internet computing is the use of a "thin server." The "thin server" is a small-profile hardware device that is bundled with software that provides a specific service or services. For example, a mail server may be considered a "thin server" in that the mail server provides a specific service, administering electronic mail accounts. Other examples of "thin servers" include a print server, ISDN router or network attached storage (NAS).

The intention of using these thin servers is that the "server in a box" should be simple to install, configure, and maintain. The reality is that configuration is the bottleneck in the process that makes it difficult to achieve the intended result.

With known systems there are currently three methods by which a thin server can be configured. The first method requires the thin server to be configured using a keyboard and monitor directly attached to the thin server. This requires that the keyboard and monitor ports be included in the hardware, even though the intention is that once configured, direct access to the thin server will no longer be needed. The problem with this solution is that each device must be individually configured using a keyboard and monitor before being placed into production. This is a labor intensive activity and may involve additional handling of the thin server before it can be rack-mounted thereby increasing the possibility of accidental damage. This solution also increases the cost of the thin servers by requiring the additional hardware (keyboard and monitor) to be present even though the hardware is used only for configuration and is later not needed.

The second method of configuring a thin server involves performing the configuration using an LED panel and controls, e.g., push buttons, that are directly attached to the thin server. This requires that the hardware design include the additional cost of a front mounted input/output display console and the cost of embedding firmware to handle the configuration tasks. Another requirement is that the person has to be physically present at the device to enter configuration data. Again, the cost of the thin server is increased by requiring the additional hardware that is only used for configuration.

The third method of configuring a thin server involves performing the configuration remotely using a TCP/IP connection and a remote workstation. This enables the thin server to be configured without the need for additional hardware incorporated into the thin server. However, current approaches to this solution must deal with locating, connecting, and securing the thin server once it is plugged in and turned on.

Thus, it would be beneficial to have apparatus and methods for configuring thin servers that do not require additional hardware to be incorporated into the thin server. It would further be beneficial to have apparatus and methods for configuring multiple thin servers easily and efficiently without requiring additional hardware to be incorporated into the thin server and without encountering the problems of locating, connecting and securing the thin server.

SUMMARY OF THE INVENTION

The present invention provides apparatus and methods for server configuration using a removable storage device. The apparatus and methods include coupling a removable storage device reader to a server and inserting a removable storage device into the reader. The removable storage device includes configuration data that is used to configure the server. When power is supplied to the server, the server performs a boot-up sequence that includes uploading the configuration data from the removable storage device. In this way, the server is configured for use in a network.

In addition, the same removable storage device reader may be used to configure a plurality of servers. That is, the removable storage device reader is capable of being easily moved and coupled to a plurality of servers one after the other. The user may make use of the same removable storage device or different removable storage devices for each of the plurality of servers.

Furthermore, the user of the present invention is not required to have any technical knowledge regarding configuring server devices. Rather, the user merely need couple the removable storage device reader to the server, insert the removable storage device and supply power to the server. The server automatically uploads the configuration information from the removable storage device and configures itself using this configuration information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
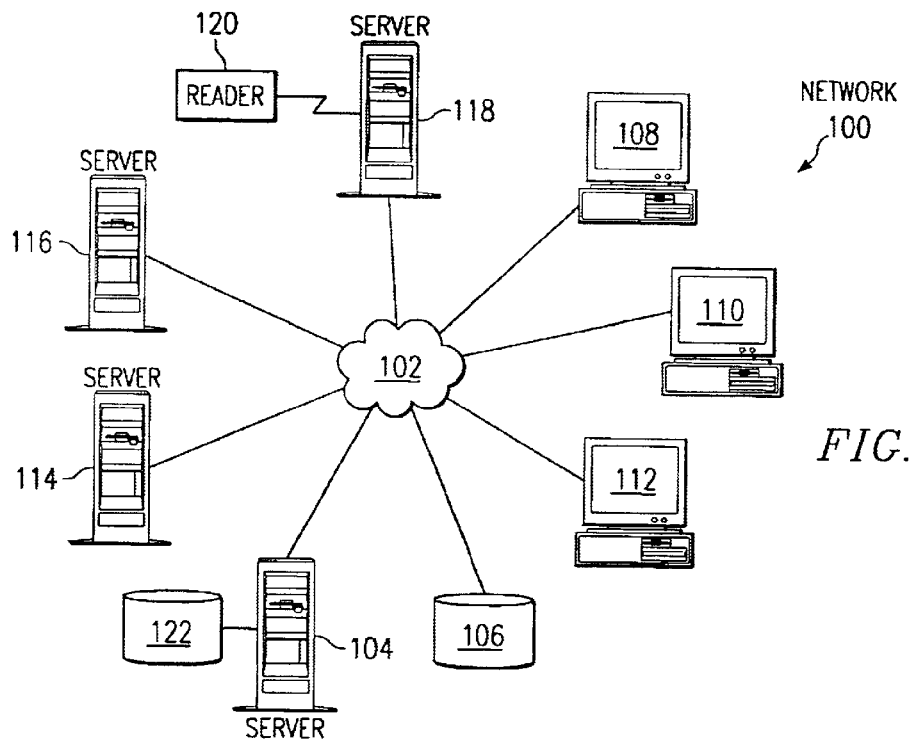
FIG. 1 is a exemplary representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communication links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. These are representative of the servers that can be configured using the present invention. Storage unit 106 is also connected to network 102, providing backup support for any or all of servers 104, 114, 116 and 118. Storage unit 122 provides dedicated backup support for server 104.

In addition, clients 108, 110 and 112 are also connected to network 102. These three clients may be, for example, personal computers or network computers. For purposes of this application, a network computer is any computer coupled to a network, that downloads all applications from the network server and obtains all of its data from and stores all changes back to the server. The network computer is similar to a diskless workstation and does not have floppy or hard disk storage.

Distributed data processing system 100 may include additional servers, clients, and other devices not shown.

In the depicted example, servers 104, 114, 116 and 118 provide services and data storage for clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages.

Of course, distributed data processing system 100 also may be implemented as a number of different types of networks, such as, for example, an intranet or a local area network. Regardless of the type of network, at the time of setup each server machine must be configured to work properly in the network. In a preferred embodiment of this invention, removable storage device reader 120 is moved from server to server in order to perform network administrative tasks. In FIG. 1 the removable storage device reader 120 is shown connected to server 118, but it can easily be connected to servers 104, 114, and 116.

A removable storage device reader 120 is shown in FIG. 1 coupled to the server 118. The removable storage device reader 120 reads configuration information from a removable storage device when the server 118 is first turned on. The removable storage device may be any type of storage medium upon which configuration data may be stored. For example, the removable storage device may be a floppy disk, a CD-ROM, a smart card, an optical disk, or the like. The removable storage device reader 120, therefore, may be any type of device capable of reading a removable storage device. For example, the removable storage device reader 120 may be a floppy disk drive, a CD-ROM drive, a smart card reader, an optical disk drive, or the like. In a preferred embodiment, for security purposes, the removable storage device is considered to be a smart card and the removable storage device reader 120 is a smart card reader, as will be described in more detail hereafter.

The server 118 is provided with boot instructions such that, upon power-up, the server 118 sends a request to the removable storage device reader 120 to read configuration data from the removable storage device inserted therein. This configuration data may include, for example, the IP address of the server, the hostname, the netmask, the gateway, domain and nameserver information for the server 118.

The configuration data is read from the removable storage device by the removable storage device reader 120 and provided to the server 118 via a wired or wireless connection between the removable storage device reader 120 and the server 118. In this way, the server 118 is configured using the configuration data read from the removable storage device.

FIG. 1 is intended as an example and not as an architectural limitation for the processes of the present invention. For example, removable storage device reader 120 might be replaced with a different type of digital device, such as a laptop computer, optical drive, CD-ROM drive and the like, and the connection might be wireless. These devices would then be able to perform administrative tasks on the servers from a remote location.

Figure 2:
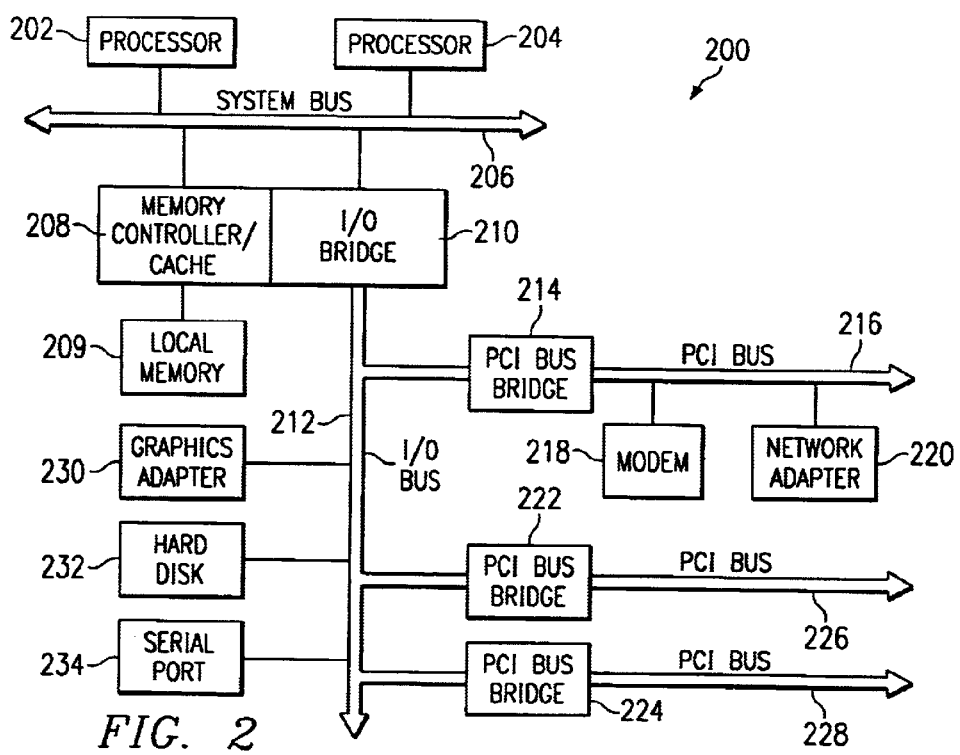
FIG. 2 is an exemplary block diagram of a data processing system that may be implemented as a server.

Referring to FIG. 2, a block diagram of a data processing system which may be implemented as a server, such as server 118 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. Typical PCI bus implementations will support four PCI expansion slots or add-in connectors. Communication links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may be connected to I/O bus 212 as depicted, either directly or indirectly.

Additionally, serial port 234 is connected to I/O bus 212. In a preferred embodiment of this invention, removable storage device reader 120 in FIG. 1, used to administer the server machine, is connected to the server via serial port 234. In different embodiments, other digital devices might be connected to server 200 through modem 218 or through wireless means.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system. Alternatively, the data processing system depicted in FIG. 2 may be configured as a "thin server" such that some of the components in FIG. 2 may not be necessary.

In the prior art, when a suite of new server machines is installed, setup, and administered, it was necessary to attach a terminal, keyboard, and/or mouse to each server machine in turn, moving these devices between the servers. This can be very awkward and time consuming since this requires connection of three different ports sing the present invention it is only necessary to use a removable storage device reader, either integrated into the server or external to the server, which can be used to upload configuration data to the server. This provides the ease of a single connection and the convenience of a very small device that is easily moved between machines.

With the present invention, the same removable storage device reader may be used to configure a plurality of servers. That is, the removable storage device reader is capable of being easily moved and coupled to a plurality of servers one after the other. The user may make use of the same removable storage device or different removable storage devices for each of the plurality of servers.

Furthermore, the user of the present invention is not required to have any technical knowledge regarding configuring server devices. Rather, the user merely need couple the removable storage device reader to the server, insert the removable storage device and supply power to the server. The server automatically uploads the configuration information from the removable storage device and configures itself using this configuration information.

In a preferred embodiment, the removable storage device is a smart card and the removable storage device reader is a smart card reader that is connected to the serial port 234 of the server. A smart card is a card, such as a credit card, with a built-in microprocessor and memory used for storing information. When inserted into a smart card reader, the smart card transfers data to and from a central computer via the smart card reader. It is more secure than a magnetic stripe card and can be programmed to self-destruct if the wrong password is entered too many times.

Figure 3:
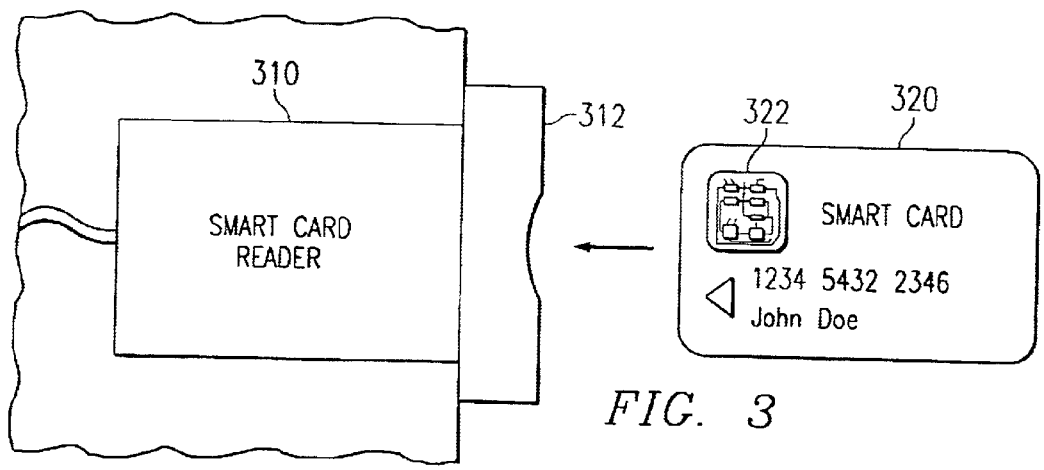
FIG. 3 is an exemplary diagram of a smart card and a smart card reader for use in configuring a server in accordance with the present invention.

FIG. 3 is an exemplary diagram of a smart card and smart card reader that may be used with the present invention. As shown in FIG. 3, the smart card reader 310 has a port 312 into which the smart card 320 is inserted. The smart card 320 has an integrated circuit and memory 322 which uploads information from the smart card to the smart card reader 310 when the smart card is inserted into the smart card reader 310.

The smart card reader 310 may be any type of smart card reader known to those of ordinary skill in the art. For example, SwapSmart from SCM is a PCMCIA card that contains a smart card drive. SwapSmart plugs into a computing device and the smart card plugs into SwapSmart. Likewise, Fischer International's Smarty lets a conventional floppy drive read smart cards. The card is inserted into Smarty, whose circuits emulate the magnetic field of a rotating floppy disk and transfer the data to the floppy's read/write head. Other similar devices may be used without departing from the spirit and scope of the present invention.

The smart card in accordance with a preferred embodiment of the present invention stores configuration data for one or more servers. The smart card can be configured with the configuration data prior to or subsequent to the physical setup of the server. Thus, the physical setup and the configuration of the device can be allocated to different personnel with different levels of technical expertise, security clearances, etc.

When a user wishes to configure a server, the user need only connect the smart card reader to the server via a data transfer cable, for example, if the smart card reader is not integrated into the server, and turn on the server. The user then inserts an appropriate smart card into the smart card reader.

When the server is turned on, a boot-up sequence is initiated and the server looks to see if a configuration profile exists on the server. The boot-up sequence is similar to known boot-up sequences where boot code instructs the server processor to look for an operating system kernel in a boot sector of a local storage device. An exemplary known boot-up sequencer is described, for example, in U.S. Pat. No. 5,307,497, which is hereby incorporated by reference.

With the present invention, instead of looking for an operating system kernel, or in addition to looking for an operating system kernel, the boot code of the server instructs the server to look for a configuration profile in a predetermined location in local memory/storage. If a configuration profile exists, then the server is already configured and need not be configured using the removable storage device reader.

In an exemplary embodiment, the server would ignore the smart card configuration profile and return a message indicating that the server has been configured according to the pre-existing configuration profile. To change the profile, a user would have to clear or erase the current configuration profile stored in the server. The server would then boot-up with no configuration profile stored in the server.

If a configuration profile does not exist, the server looks to a specific location for a configuration profile on a smart card. This specific location is based on a determination made by the server of which devices are coupled to the server. For example, the server may have settings indicating an order in which devices are to be searched for configuration profiles. This may be similar to setting the boot sequence in BIOS with conventional computers.

In response to finding a configuration profile on the removable medium, in this example a smart card, the smart card reader reads the configuration profile data from the smart card and stores it in the server. The server is thereby configured for use in the appropriate network.

After configuration, the server checks to determine if backup files exist in a location specified in the configuration profile. If there are no backup files in the designated location, the server is placed in operation as configured.

If there are backup files in the specified location, these backup files may be restored in the event that the server has experienced a mechanical failure. Thus, for example, if a server fails due to mechanical failure, a replacement server with no configuration profile may be brought in and booted-up such that the replacement server retrieves the configuration profile from the smart card reader. The replacement server will have the same configuration profile as the failed server. The replacement server will then check for backup files and downloads these files into its local memory/storage. In this way, the replacement server is able to go online with minimal downtime.

Figure 4:
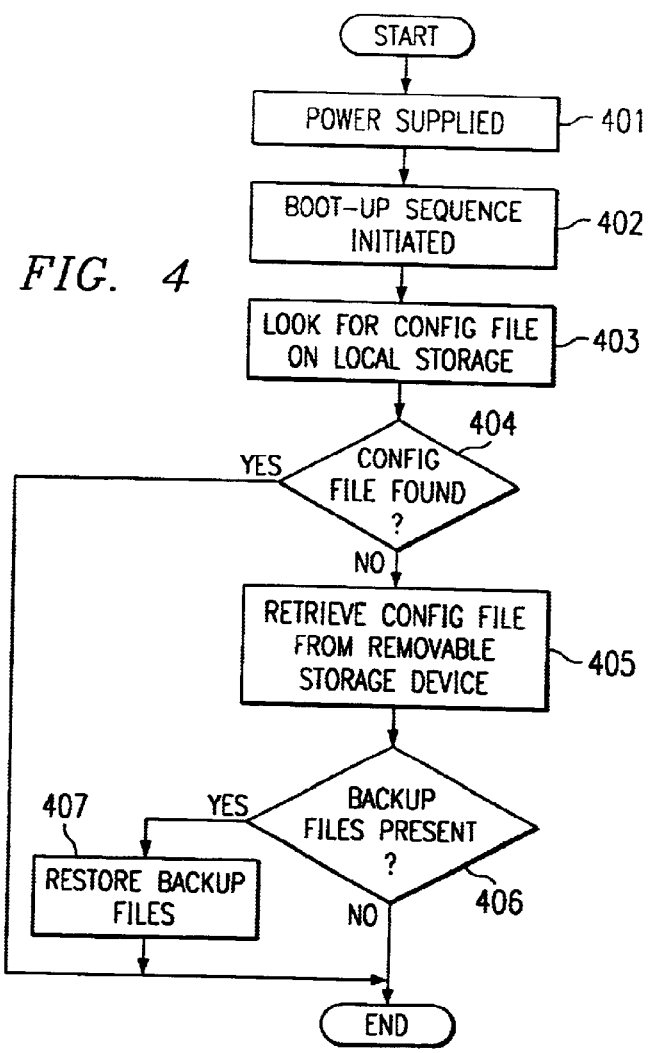
FIG. 4 is a flowchart outlining an exemplary operation of the present invention.

FIG. 4 is a flowchart outlining an exemplary operation of the present invention. As shown in FIG. 4, the operation starts with power being supplied to the server (step 401). The server initiates a boot-up sequence (step 402). The server looks for a configuration profile in a designated location on the local storage of the server (step 403).

A determination is made as to whether a configuration profile is found (step 404). If not, the server retrieves a configuration profile from a smart card location and stores it in local storage (step 405). If so, the server is already configured and no further action to configure the server is necessary. Thus, the operation ends.

A determination is then made as to whether or not backup files are present at a location designated by the configuration profile information (step 406). If not, the server is configured for use with the network and the operation ends. If so, the backup files are used to restore the configuration profile of the server (step 407). As mentioned above, this may occur when there is a mechanical failure of the server. Thereafter, the operation ends.

Thus, the present invention provides a mechanism by which servers may be configured without required extensive extra hardware to be incorporated into the servers. The mechanism allows a user to quickly configure one or more servers using a removable storage device reader. In this way, the removable storage device can be created at a remote time and/or place from the creation of the installation, configuration, and setup of the server itself. Furthermore, the user is not required to manually input configuration information for each server at the time of installation and setup. Rather, the removable storage device stores the configuration profile that is uploaded to the server when the server is powered on and executes a boot-up sequence.

The present invention may be used in a number of different instances where the tasks of physically setting up the server and configuring the server are separate tasks. For example, the present invention allows a single smart card to be used to configure a plurality of servers. Alternatively, a number of smart cards may be created with appropriate configuration data for configuring a plurality of servers. In either case, the task of configuring the servers is simplified by requiring that the user merely attach a smart card reader to the server (if the smart card reader is not integrated to the server), insert the smart card and provide power to the server. The user need not attach a monitor, keyboard, mouse or other peripheral equipment and then proceed to enter configuration information into the server manually, as is required by the prior art.

As mentioned above, the present invention is not limited to the particular embodiments described herein. For example, other storage devices may be used instead of a smart card and smart card reader. Furthermore, the smart card reader may be integrated into the server if cost is not an issue. The server may be configured as a conventional server or as a thin server. Other modifications may be made without departing from the spirit and scope of the present invention.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed:

1. A method of configuring a plurality of thin servers, comprising:

coupling a removable storage medium reader, having a first removable storage medium with a first configuration profile, to a first thin server;

supplying power to the first thin server;

determining if a configuration profile exists in local storage on the first thin server;

if a configuration profile does not exist in local storage on the first thin server, uploading the configuration profile from the removable storage medium to the first thin server in response to supplying power to the first thin server;

decoupling the removable storage medium reader from the first thin server;

coupling the removable storage medium reader, having a second removable storage medium with a configuration file, to a second thin server different from the first thin server;

supplying power to the second thin server;

determining if a configuration profile exists in local storage on the second thin server; and if a configuration profile does not exist in local storage on the second thin server, unloading the second configuration profile from the second removable storage medium to the second thin server in response to supplying power to the second thin server.

2. The method of claim 1, wherein the removable storage medium reader is a smart card reader and the first and second removable storage medium are smart cards.

3. The method of claim 1, wherein the first and second removable storage medium are one of a floppy disk, a CD-ROM, an optical disk, or a smart card.

4. The method of claim 1, wherein the configuration profile includes one or more of an IP address of the server, a hostname, a netmask, a gateway, a domain, or a nameserver.

5. The method of claim 1, wherein coupling the removable storage medium reader to the first thin server includes coupling the removable storage medium reader to the first thin server using one of a wired or wireless connection.

6. The method of claim 1, further comprising:

determining if backup files exist in a storage location identified by the first configuration profile; and if backup files exist, restoring the backup files to the first thin server.

7. The method of claim 1, wherein the first thin server is a replacement thin server for a failed server.

8. The method of claim 1, wherein the first configuration file is uploaded to the first thin server without user intervention and wherein the user is not required to have technical knowledge regarding configuring servers.

9. A method of configuring a plurality of thin servers, comprising:

coupling a removable storage device reader to a first thin server, providing a first removable storage medium having first server configuration information stored thereon;

uploading the first server configuration information to the first thin server upon boot-up of the first thin server;

decoupling the removable storage device reader from the first server;

coupling the removable storage device reader to a second thin server;

providing a second removable storage medium having second server configuration information stored thereon; and uploading the second server configuration information to the second thin server upon boot-up of the second thin server.

10. The method of claim 9, wherein the first removable storage medium and the second storage medium are the same.

11. The method of claim 9, wherein the removable storage medium reader is a smart card reader and the first removable storage medium and second removable storage medium are smart cards.

12. The method of claim 9, wherein the first removable storage medium and second removable storage medium are one of a floppy disk, a CD-ROM, an optical disk, or a smart card.

13. The method of claim 9, wherein the first server configuration information and second server configuration information include one or more of an IP address of the server, a hostname, a netmask, a gateway, a domain or a nameserver.

14. An apparatus for configuring a plurality of thin servers, comprising:

a removable storage medium; and a removable storage medium reader, wherein the removable storage medium contains server configuration data and the removable storage medium reader is capable of being sequentially coupled to a plurality of thin servers, and wherein when the removable storage medium reader is coupled to a thin server and power is supplied to the thin server, the configuration data is uploaded from the removable storage medium to the thin server via the removable storage medium reader, wherein the removable storage medium reader is capable of being sequentially coupled to the plurality of servers by:

coupling the removable storage medium reader to a first thin server;

supplying power to the first thin server and thereby uploading the configuration data from the removable storage medium to the first thin server;

decoupling the removable storage medium reader from the first thin server, coupling the removable storage medium reader to a second thin server; and supplying power to the second thin server and thereby uploading the configuration data from the removable storage medium to the second thin server.

15. The apparatus of claim 14, wherein the removable storage medium reader is a smart card reader and the removable storage medium is a smart card.

16. The apparatus of claim 14, wherein the removable storage medium is one of a floppy disk, a CD-ROM, an optical disk, or a smart card.

17. The apparatus of claim 14, wherein the configuration data includes one or more of an IP address of the server, a hostname, a netmask, a gateway, a domain or a nameserver.

18. The apparatus of claim 14, wherein the removable storage medium reader is capable of being coupled to the plurality of thin servers using one of a wired or wireless connection.

19. A system for configuring a plurality of thin servers, comprising:

a plurality of thin servers;

a removable storage medium reader that is sequentially coupled to and decoupled from each thin server of the plurality of thin servers; and a removable storage medium coupled to the removable storage medium reader, wherein the removable storage medium contains server configuration data, and wherein when power is supplied to a thin server to which the removable storage medium reader is coupled, the configuration data is uploaded from the removable storage medium to the thin server via the removable storage medium reader.

20. The system of claim 19, wherein the removable storage medium reader is a smart card reader and the removable storage medium is a smart card.

21. The system of claim 19, wherein the removable storage medium is one of a floppy disk, a CD-ROM, an optical disk, or a smart card.

22. The system of claim 19, wherein the configuration data includes one or more of an IP address of the server, a hostname, a netmask, a gateway, a domain or a nameserver.

23. The system of claim 19, wherein the removable storage medium reader is capable of being coupled to the plurality of servers using one of a wired or wireless connection.

* * * * *